US012609457B2

(12) United States Patent
Tang

(10) Patent No.: US 12,609,457 B2
(45) Date of Patent: Apr. 21, 2026

(54) ANTENNA

(71) Applicant: LINQ ANTENNA TECHNOLOGY INC., La Puenta, CA (US)

(72) Inventor: Hong Tang, Foshan (CN)

(73) Assignee: LINQ ANTENNA TECHNOLOGY INC., La Puenta, CA (US)

( * ) Notice: Subject to any disclaimer, the term of this patent is extended or adjusted under 35 U.S.C. 154(b) by 300 days.

(21) Appl. No.: 18/379,414

(22) Filed: Oct. 12, 2023

(65) Prior Publication Data

US 2024/0413540 A1 Dec. 12, 2024

Related U.S. Application Data

(63) Continuation-in-part of application No. PCT/CN2023/101872, filed on Jun. 21, 2023.

(30) Foreign Application Priority Data

Jun. 8, 2023 (CN) ......................... 202310677770.9

(51) Int. Cl.
*H01Q 13/20* (2006.01)
*H01Q 1/38* (2006.01)
(Continued)

(52) U.S. Cl.
CPC ............... *H01Q 13/20* (2013.01); *H01Q 1/50* (2013.01)

(58) Field of Classification Search
CPC .... H01Q 21/064; H01Q 13/18; H01Q 21/005; H01Q 1/38; H01Q 1/48; H01Q 13/10;
(Continued)

(56) References Cited

U.S. PATENT DOCUMENTS

2002/0101385 A1* 8/2002 Huor .................... H01Q 21/005 343/770
2013/0120205 A1* 5/2013 Thomson ............. H01Q 21/064 29/600
(Continued)

FOREIGN PATENT DOCUMENTS

CN 102064380 5/2011
CN 216055193 3/2022
(Continued)

*Primary Examiner* — Wei (Victor) Y Chan
(74) *Attorney, Agent, or Firm* — Dicke, Billig & Czaja, PLLC

(57) ABSTRACT

Provided is an antenna, which integrates a waveguide structure and an ordinary feeding network, thereby avoiding a complex structure. The antenna can be used as a base station antenna and wifi antenna. The antenna includes: a waveguide radiator, including a lower radiation panel and at least one waveguide structure provided on the lower radiation panel; an upper-layer radiator, including an upper radiation panel, wherein the upper radiation panel is provided with at least one opening, and the opening is corresponding to the waveguide structure one by one; and a feeding network, connected to each waveguide structure, wherein at least a part of the feeding network is provided between the lower radiation panel and the upper radiation panel, and has a gap with the lower radiation panel and the upper radiation panel, respectively.

18 Claims, 5 Drawing Sheets

(51) Int. Cl.
*H01Q 1/50* (2006.01)
*H01Q 13/18* (2006.01)

(58) Field of Classification Search
CPC .. H01Q 21/0037; H01Q 21/24; H01Q 1/3233; H01Q 15/246; H01Q 21/0031
See application file for complete search history.

(56) References Cited

U.S. PATENT DOCUMENTS

2015/0364831 A1* 12/2015 Li ............................ H01Q 5/50 343/816
2022/0209425 A1 6/2022 Zhang et al.
2023/0170622 A1* 6/2023 Zhao ....................... H01P 3/081 343/702

FOREIGN PATENT DOCUMENTS

CN 114824784 X 7/2022
JP 2010-103806 5/2010

* cited by examiner

ANTENNA

CROSS-REFERENCE TO RELATED APPLICATIONS

This application is a Continuation-in-Part of copending International Application No. PCT/CN2023/101872, filed Jun. 21, 2023, which claims priority to the Chinese patent application No. 202310677770.9, filed on Jun. 8, 2023 with the Chinese Patent Office and entitled "Antenna", the contents of which are incorporated herein by reference in entirety.

TECHNICAL FIELD

The present disclosure relates to the technical field of communications, and in particular to an antenna.

BACKGROUND ART

An antenna, as a converter, converts guided waves propagated on a transmission line into electromagnetic waves propagated in a free space, or vice versa, which is a component for transmitting or receiving electromagnetic waves in a radio apparatus.

However, the antenna in the related art, such as microstrip antenna, circuit board antenna, and symmetrical array antenna, is complex in structure, and is inconvenient to process due to a small operating wavelength thereof after an operating frequency of the antenna reaches a certain frequency. Moreover, material consumption of the circuit board is also continuously increased.

SUMMARY

Embodiments of the present disclosure aim at providing an antenna, so as to solve the problems that the antenna is complex in structure, and is inconvenient to process. Specific technical solutions are as follows.

An embodiment of the present disclosure provides a novel antenna, including: a waveguide radiator, including a lower radiation panel and at least one waveguide structure provided on the lower radiation panel; an upper-layer radiator, including an upper radiation panel, wherein the upper radiation panel is provided with at least one opening, and the opening is corresponding to the waveguide structure one by one; and a feeding network, connected to each waveguide structure, wherein at least a part of the feeding network is provided between the lower radiation panel and the upper radiation panel, and has a gap with the lower radiation panel and the upper radiation panel, respectively.

In some embodiments of the present disclosure, each waveguide structure penetrates through the lower radiation panel; an upper end of each waveguide structure extends out of the lower radiation panel towards a direction of the upper radiation panel, and the feeding network is connected to the upper end of each waveguide structure.

In some embodiments of the present disclosure, the waveguide structure has a hollow cavity, and the upper end of each waveguide structure is provided with a notch; and the feeding network at least includes a first-level connecting line, the first-level connecting line includes at least one first end, and the first end extends into the hollow cavity of the waveguide structure through the notch.

In some embodiments of the present disclosure, the waveguide structure is a cylindrical structure provided on the lower radiation panel, and the inner cavity of the cylindrical structure forms the hollow cavity of the waveguide structure; or the waveguide radiator includes a waveguide radiation block, an upper surface of the waveguide radiation block constitutes the lower radiation panel, the waveguide radiation block has a through hole in a thickness direction, and the through hole constitutes the hollow cavity of the waveguide structure.

In some embodiments of the present disclosure, the feeding network includes a first network portion and a second network portion, the first network portion and the second network portion are located at two sides of the waveguide structure, respectively; and two notches are provided at the upper end of each waveguide structure, wherein one notch is configured for a first end of the first network portion to pass through, and the other notch is configured for a first end of the second network portion to pass through.

In some embodiments of the present disclosure, the feeding network further includes at least one ground terminal connected to the first-level connecting line. The position of the ground terminal is not limited. The ground terminal also may be provided at other positions of the feeding network, or the ground terminal may not be provided.

In some embodiments of the present disclosure, the waveguide structure is a rectangular waveguide, a circular waveguide or a ridge waveguide.

In some embodiments of the present disclosure, the upper-layer radiator further includes an auxiliary radiation structure, the auxiliary radiation structure is provided at a side of the upper radiation panel facing away from the lower radiation panel, and is attached to the upper radiation panel.

In some embodiments of the present disclosure, the auxiliary radiation structure includes a beveled edge structure and/or a radiation ring; and the beveled edge structure extends along an extending direction of the upper radiation panel, and the radiation ring is corresponding to the opening of the upper radiation panel in position and surrounds the opening.

In some embodiments of the present disclosure, the number of openings of the upper radiation panel is the same as the number of waveguide structures, the number of radiation rings is the same as the number of openings, the plurality of radiation rings are corresponding to the plurality of openings one by one, and the plurality of radiation rings are connected.

In some embodiments of the present disclosure, the auxiliary radiation structure includes a choke slot or a right-angled edge structure provided at a side of the upper radiation panel facing away from the lower radiation panel, and the choke slot or the right-angled edge structure extends along an extending direction of the upper radiation panel.

In some embodiments of the present disclosure, the waveguide radiator and the upper-layer radiator are made of a metal material, or plated with a metal material on surfaces.

In some embodiments of the present disclosure, the feeding network is made of a metal material, and the metal material has a thickness of 0.1-2 mm, preferably, 0.1 mm, 0.5 mm, 0.8 mm, 1 mm, 1.2 mm or 1.5 mm.

In some embodiments of the present disclosure, the feeding network is of a strip-shaped line, microstrip, coaxial line or coplanar waveguide structure.

In some embodiments of the present disclosure, the feeding network is located on the same plane; or the feeding network is at least partially bent, and the feeding network is located on two planes having an included angle.

In some embodiments of the present disclosure, the feeding network is of a series-connection structure, a parallel-connection structure or a hybrid structure including series connection and parallel connection.

In some embodiments of the present disclosure, the antenna further includes a plurality of insulating gaskets, wherein the plurality of insulating gaskets are respectively provided between the feeding network and the lower radiation panel and between the feeding network and the upper radiation panel. A shape and a thickness of the insulating gaskets can be dependent upon design requirements, and the insulating gaskets may be in a square shape, a rectangular shape or a clip type.

In some embodiments of the present disclosure, the polarization of the antenna can be any of horizontal polarization, vertical polarization, positive and negative 45 degree polarization, X polarization, Y polarization, Z polarization, or oblique polarization.

The antenna in the embodiments of the present disclosure includes the waveguide radiator, the upper-layer radiator, and the feeding network. In the above, the upper-layer radiator includes the upper radiation panel, the upper-layer radiator can receive electromagnetic waves in a free space or radiate electromagnetic waves into a free space, and the upper-layer radiator also can be used as a radiation-pattern control plane to control an angle of a radiation pattern of the antenna. The waveguide radiator includes the lower radiation panel and the waveguide structure, and the waveguide radiator not only can guide electromagnetic waves directionally to reduce energy loss, but also can serve as a radiation unit to receive the electromagnetic waves from the free space or radiate the electromagnetic waves into the free space. At least a part of the feeding network is provided between the upper radiation panel and the lower radiation panel, and has a gap with the upper radiation panel and the lower radiation panel, respectively, that is, the feeding network is overhead between the upper radiation panel and the lower radiation panel. The feeding network is connected to the waveguide structure, so that the feeding network can transmit electromagnetic waves between the waveguide radiator and an antenna interface. Compared with the related art, the antenna in the embodiments of the present disclosure combines the waveguide structure and the feeding network, the waveguide radiator and the upper-layer radiator are simple in structure, and an arrangement mode of the feeding network is simple, so that the antenna has a simple structure and is convenient to process.

Definitely, it is unnecessary for any product or method implementing the present disclosure to simultaneously achieve all of the above advantages.

BRIEF DESCRIPTION OF DRAWINGS

The drawings described herein are used to provide further understanding of the present disclosure and form a part of the present disclosure, and exemplary embodiments of the present disclosure and description thereof are used to explain the present disclosure, and do not constitute an improper limitation to the present disclosure.

Figure 1:
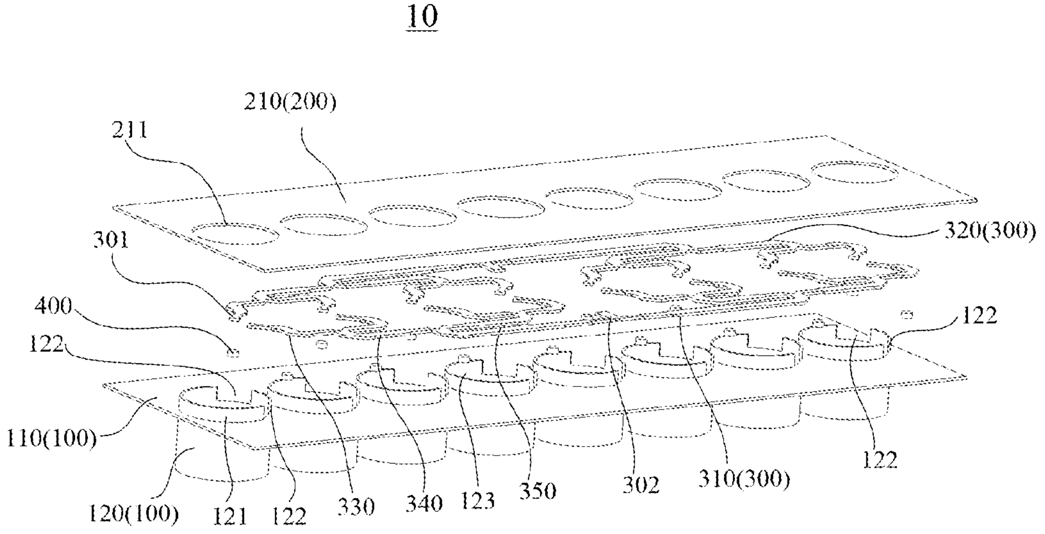
FIG. 1 is an exploded schematic diagram of an antenna in Embodiment 1 of the present disclosure.

In the drawings: antenna 10; waveguide radiator 100; waveguide radiation block 101; lower radiation panel 110; waveguide structure 120; upper end 121; notch 122; hollow cavity 123; extension plate 130; upper-layer radiator 200; upper radiation panel 210; opening 211; auxiliary radiation structure 220; beveled edge structure 221; inclined surface 222; radiation ring 223; choke slot 224; feeding network 300; first end 301; second end 302; first network portion 310; second network portion 320; first-level connecting line 330; second-level connecting line 340; third-level connecting line 350; ground terminal 360; insulating gasket 400; screw 500.

DETAILED DESCRIPTION OF EMBODIMENTS

In order to make objectives, technical solutions, and advantages of the present disclosure clearer, the present disclosure is further described in detail below with reference to the drawings and embodiments. Apparently, some but not all embodiments of the present disclosure are described. All of other embodiments, obtained by a person ordinarily skilled in the art based on the embodiments in the present disclosure, belong to the scope of protection of the present disclosure.

As described in Background Art, the antenna in the related art, such as microstrip antenna, circuit board antenna, and symmetrical array antenna, is complex in structure, and inconvenient to process due to a small operating wavelength thereof after an operating frequency of the antenna reaches a certain frequency.

In view of this, as shown in FIG. 1, Embodiment 1 of the present disclosure provides an antenna 10, including a waveguide radiator 100, an upper-layer radiator 200, and a feeding network 300. In the above, the waveguide radiator 100 includes a lower radiation panel 110 and at least one waveguide structure 120 provided on the lower radiation panel 110. The upper-layer radiator 200 includes an upper radiation panel 210, the upper radiation panel 210 is provided with at least one opening 211, and the openings 211 are corresponding to the waveguide structures 120 one by one. The feeding network 300 is provided between the lower radiation panel 110 and the upper radiation panel 210, and has a gap with the lower radiation panel 110 and the upper radiation panel 210, respectively, and the feeding network 300 is connected to each waveguide structure 120.

The antenna 10 in the embodiment of the present disclosure includes the waveguide radiator 100, the upper-layer radiator 200, and the feeding network 300. In the above, the upper-layer radiator 200 includes the upper radiation panel 210, the upper-layer radiator 200 can receive electromagnetic waves in a free space or radiate electromagnetic waves into a free space, and the upper-layer radiator 200 also can be used as a radiation-pattern control plane to control an angle of a radiation pattern of the antenna 10. The waveguide radiator 100 includes the lower radiation panel 110 and the waveguide structures 120, and the waveguide radiator 100 not only can guide electromagnetic waves directionally to reduce energy loss, but also can serve as a radiation unit to receive the electromagnetic waves from the free space or radiate the electromagnetic waves into the free space. At least a part of the feeding network 300 is provided between the upper radiation panel 210 and the lower radiation panel 110, and has a gap with the upper radiation panel 210 and the lower radiation panel 110, respectively. That is to say, the feeding network 300 is overhead between the upper radiation panel 210 and the lower radiation panel 110. The feeding network 300 is connected to the waveguide structure 120, so that the feeding network 300 can transmit electromagnetic waves between the waveguide radiator 100 and the interface of the antenna 10. Compared with the related art, the antenna 10 in the embodiment of the present disclosure combines the waveguide structure 120 and the feeding network 300, the waveguide radiator 100 and the upper-layer radiator 200 are simple in structure, and the feeding network 300 is in a simple arrangement mode, so that the antenna 10 has a simple structure and is convenient to process.

The antenna 10 in the embodiment of the present disclosure can be used as a transmitting antenna, a receiving antenna, or an antenna having both transmitting and receiving functions. Specifically, when the antenna 10 in the embodiment of the present disclosure is used as a transmitting antenna, the electromagnetic waves are transmitted to the feeding network 300 via the antenna interface, then transmitted to the waveguide structure 120 via the feeding network 300, and then directly radiated to the free space via the waveguide structure 120; or directionally transmitted to the upper-layer radiator 200 via the waveguide structure 120, and radiated to the free space by the upper-layer radiator 200, so as to complete the transmission for the electromagnetic waves. When the antenna 10 in the embodiment of the present disclosure is used as a receiving antenna, the upper-layer radiator 200 receives the electromagnetic waves in the free space and transmits the same into the waveguide structure 120, or the waveguide structure 120 also can directly receive the electromagnetic waves in the free space, and the electromagnetic waves are directionally transmitted into the feeding network 300 via the waveguide structure 120, and finally output through the antenna interface.

The antenna 10 in the embodiment of the present disclosure can serve as a base station antenna and a wifi antenna. Specifically, the antenna 10 can serve as a wifi6 antenna and a wifi6e antenna, and an operating frequency of the antenna 10 can be greater than 5.5-7.2 GHz. The antenna 10 may also be applied to 4G and 5G mobile communication, that is, the fourth generation mobile communication technology and the fifth generation mobile communication technology.

As shown in FIG. 1, in Embodiment 1, a plurality of waveguide structures 120 are provided, each waveguide structure 120 penetrates through the lower radiation panel 110, and the waveguide structures 120 are arranged along an extending direction of the lower radiation panel 110. Each waveguide structure 120 can be regarded as one antenna unit. An upper end 121 of each waveguide structure 120 extends out of the lower radiation panel 110 towards a direction of the upper radiation panel 210. As shown in FIG. 1, the feeding network 300 is connected to the upper end 121 of each waveguide structure 120. Therefore, a connecting manner between the feeding network 300 and the waveguide structures 120 is simpler.

As shown in FIG. 1, each waveguide structure 120 has a hollow cavity 123. Specifically, in Embodiment 1, the waveguide structures 120 may be a plurality of cylindrical structures provided on the lower radiation panel 110, and inner cavities of the cylindrical structures form the hollow cavities 123 of the waveguide structures 120. The waveguide structure 120 may be a circular waveguide, wherein circular waveguide is a regular metal waveguide with a circular section and filled therein with an air medium.

The upper end 121 of each waveguide structure 120 is provided with a notch 122. The feeding network 300 is in a parallel structure, and the feeding network 300 is provided with connecting lines of multiple levels. The connecting line of each level may include a plurality of first ends 301 and one second end 302, the connecting line of each level can split or merge the electromagnetic waves, and the connecting lines of multiple levels form a waveguide power divider. As shown in FIG. 1, a plurality of first ends 301 of a first-level connecting line 330 extend into the hollow cavities 123 of a plurality of adjacent waveguide structures 120 respectively through the notches 122, the first ends 301 of connecting lines of other remaining levels are connected respectively to the second end 302 of the connecting line of a preceding level, and the second end 302 of the connecting line of a last level is connected to the antenna interface.

It can be understood that the number of levels of connecting lines is related to the number of waveguide structures 120 and the number of first ends 301 of the connecting line of each level. Specifically, as shown in FIG. 1, in Embodiment 1, eight waveguide structures 120 are provided, and the connecting lines are provided in three levels. The connecting line of each level includes two first ends 301 and one second end 302, wherein the two first ends 301 of the first-level connecting line 330 extend respectively into the hollow cavities 123 of two adjacent waveguide structures 120 through the notches 122; the second end 302 of the first-level connecting line 330 is connected to the first ends 301 of a second-level connecting line 340; the second end 302 of the second-level connecting line 340 is connected to the first ends 301 of a third-level connecting line 350; and the second end 302 of the third-level connecting line 350 is connected to the antenna interface. The antenna interface may be an N-type connector, an SMA connector, or the like, and a type of the connector does not affect performances of the antenna 10.

In the embodiment of the present disclosure, the first ends 301 of the first-level connecting line 330 are not limited in shape, as long as thickness and length meet requirements.

In other embodiments of the present disclosure, more or less waveguide structures 120 may be provided, and correspondingly, the number of levels of the connecting lines may be more or less, which is not limited in the present disclosure.

In other embodiments of the present disclosure, the feeding network 300 may be in a series-connection structure or a hybrid structure including series connection and parallel connection, which is not limited in the present disclosure.

As shown in FIG. 1, in Embodiment 1, the feeding network 300 includes a first network portion 310 and a second network portion 320. The first network portion 310 and the second network portion 320 are independent from each other, and the first network portion 310 and the second network portion 320 are located at two sides of the waveguide structures 120 respectively. Two notches 122 are provided at the upper end 121 of each waveguide structure 120, wherein one notch 122 is configured for a first end 301 of the first network portion 310 to pass through, and the other notch 122 is configured for a first end 301 of the second network portion 320 to pass through. In the embodiment of the present disclosure, the first network portion 310 and the second network portion 320 are respectively corresponding to two polarizations, and the two polarizations share one waveguide structure 120, thereby facilitating in simplifying the structure of the antenna 10; and polarization adopts a positive and negative 45 degree polarization method.

In the embodiment of the present disclosure, the first network portion 310 and the second network portion 320 are of the same structure. In other embodiments of the present disclosure, the first network portion 310 and the second network portion 320 may be of completely different structures. This is not limited in the present disclosure.

Figure 2:
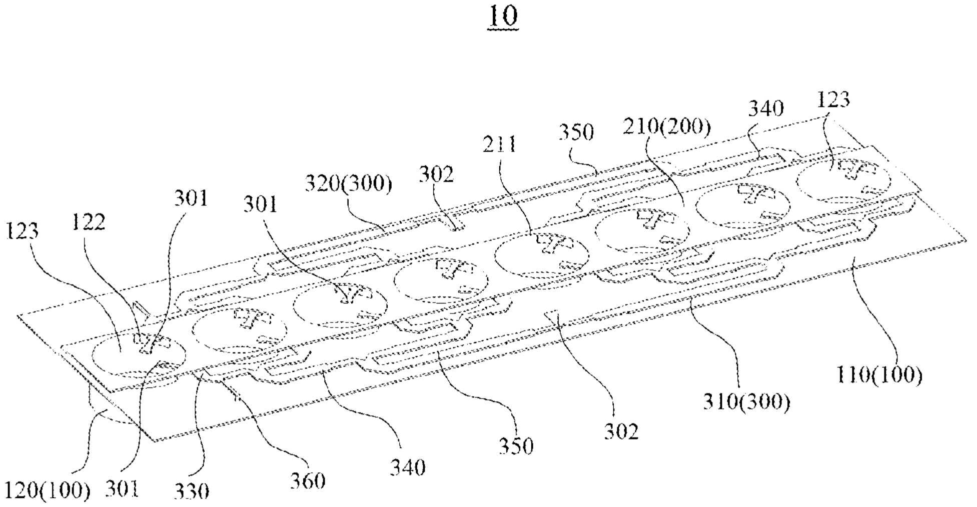
FIG. 2 is a structural schematic diagram of an antenna in Embodiment 2 of the present disclosure.

In Embodiment 2, as shown in FIG. 2, on the basis of Embodiment 1 shown in FIG. 1, the feeding network 300 further includes a ground terminal 360, wherein the ground terminal 360 can be connected to the first-level connecting line 330. The lightning disasters can be avoided by providing the ground terminal 360, so as to improve the use security of the antenna 10. In the embodiments of the present disclosure, a position of the ground terminal 360 is not limited. The ground terminal 360 also may be provided at other positions of the feeding network 300, which is not limited in the present disclosure. In addition, in other embodiments of the present disclosure, the feeding network 300 may be provided with a plurality of ground terminals 360 according to a use environment of the antenna 10. For example, each waveguide structure 120 is provided with one ground terminal 360. Alternatively, the ground terminal 360 may not be provided.

As shown in FIG. 1, in Embodiment 1, the feeding network 300 is of a strip-shaped line structure. The strip-shaped line is a transmission line constituted by two grounding metal belts and a middle rectangular-section conductor belt with a width of w and a thickness of t, that is, a transmission line between dielectric disposed between two parallel grounding planes or power planes, which has advantages such as a small volume, a light weight, a wide frequency band, a simple process, and a low cost.

In the embodiments of the present disclosure, the feeding network 300 is made of a metal material, and the metal material has a thickness of 0.1-2 mm. Preferably, the thickness of the metal material may be 0.1 mm or 0.5 mm or 0.8 mm or 1 mm or 1.2 mm or 1.5 mm.

As shown in FIG. 1, in Embodiment 1, the feeding network 300 is located on the same plane parallel to the lower radiation panel 110. The antenna 10 further includes a plurality of insulating gaskets 400. The plurality of insulating gaskets 400 are provided respectively between the feeding network 300 and the lower radiation panel 110 and between the feeding network 300 and the upper radiation panel 210. Therefore, the feeding network 300 can be overhead between the upper radiation panel 210 and the lower radiation panel 110.

Further, the insulating gaskets 400 may be plastic gaskets, that is, the insulating gaskets 400 are made of plastic.

In the embodiments of the present disclosure, a shape and a thickness of the insulating gaskets 400 can be dependent upon design requirements, and the insulating gaskets 400 may be in a square shape, a rectangular shape or a clip type.

As shown in FIG. 1, in Embodiment 1, the number of openings 211 of the upper radiation panel 210 is the same as the number of waveguide structures 120, and the openings 211 are in one-to-one correspondence with the waveguide structures 120 in position. Since the waveguide structures 120 are circular waveguides, correspondingly, the openings 211 of the upper radiation panel 210 are circular.

It should be noted that, in the embodiments of the present disclosure, as shown in FIG. 1, the upper radiation panel 210 may have a relatively large size so as to cover the whole feeding network 300. In other embodiments of the present disclosure, as shown in Embodiment 2 in FIG. 2, the size of the upper radiation panel 210 is relatively small, and the upper radiation panel 210 can cover only a part of the feeding network 300, which is not limited in the present disclosure, as long as the upper radiation panel 210 meets size requirements on the openings 211.

In the embodiments of the present disclosure, the waveguide radiator 100 and the upper-layer radiator 200 are made of a metal material, such as aluminum, copper or iron. Alternatively, the surfaces of the waveguide radiator 100 and the upper-layer radiator 200 are plated with a metal material, such as, gold, silver, or copper. In a specific embodiment, the waveguide radiator 100 and the upper-layer radiator 200 are made of a plastic material, and plastic surfaces thereof are plated with copper. This is not specifically limited in the present disclosure, as long as the waveguide radiator 100 and the upper-layer radiator 200 can have conductive characteristic.

Figure 3A:
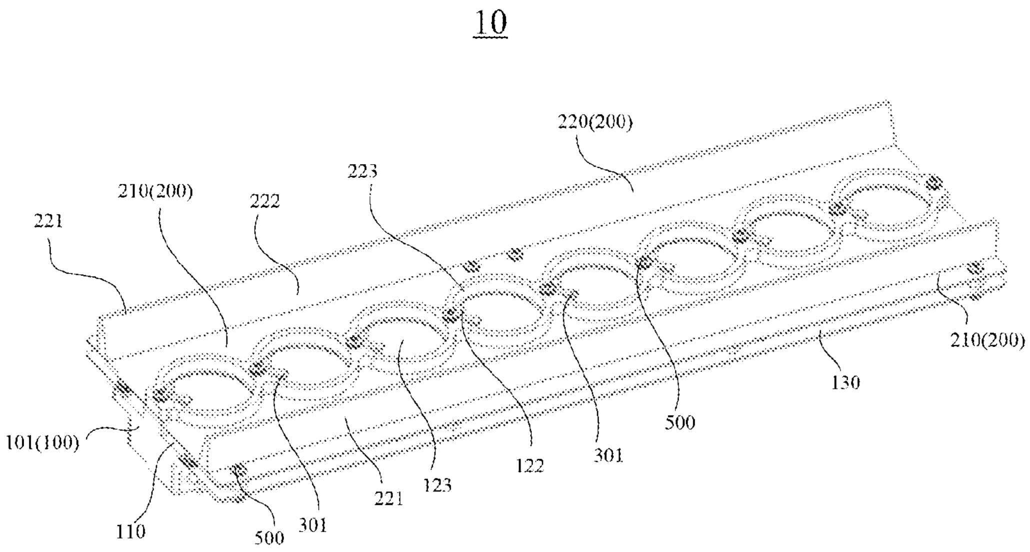
FIG. 3*a* is a structural schematic diagram of an antenna in Embodiment 3 of the present disclosure.
Figure 3B:
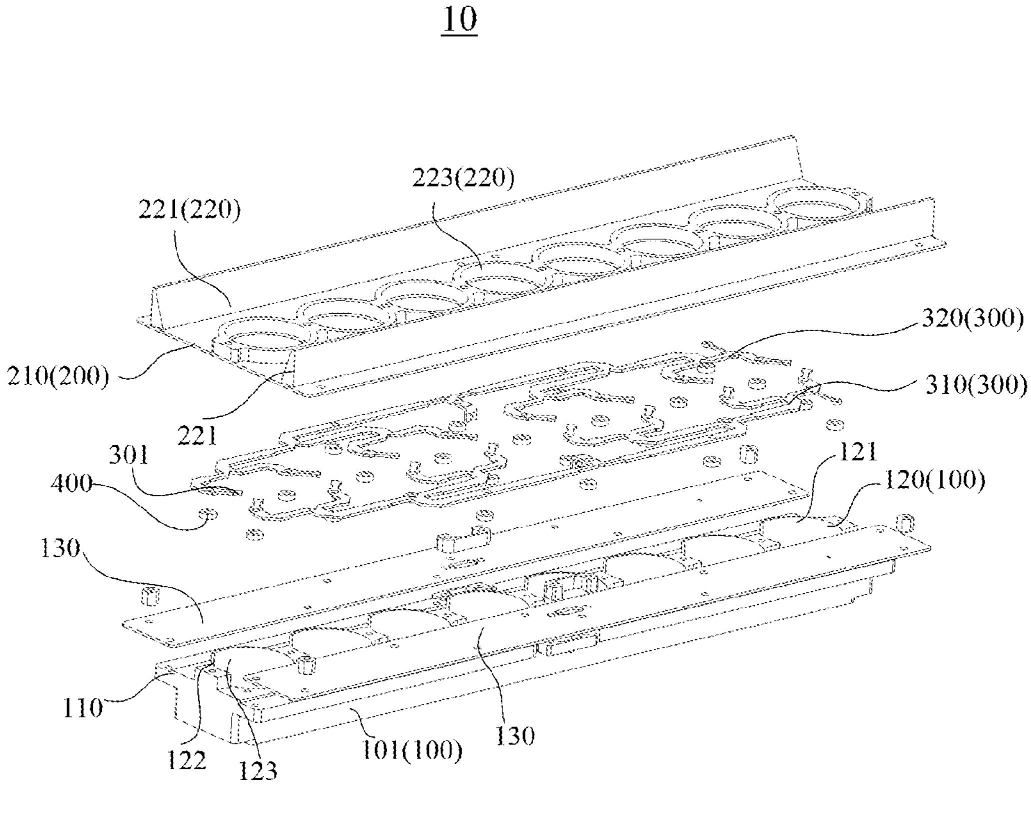
FIG. 3*b* is a exploded schematic diagram of the antenna shown in FIG. 3*a;*

As shown in FIG. 3*a* and FIG. 3*b*, in Embodiment 3 of the present disclosure, different from Embodiment 1, the waveguide radiator 100 includes a waveguide radiation block 101. An upper surface of the waveguide radiation block 101 constitutes the lower radiation panel 110, the waveguide radiation block 101 has through holes in a thickness direction, and the through holes constitute the hollow cavities 123 of the waveguide structures 120. The waveguide radiation block 101 can be regarded as a block-shaped structure composed of a waveguide radiation material.

In addition, in Embodiment 3, the upper-layer radiator 200 further includes an auxiliary radiation structure 220, wherein the auxiliary radiation structure 220 is provided at a side of the upper radiation panel 210 facing away from the lower radiation panel 110, and is attached to the upper radiation panel 210.

Specifically, the auxiliary radiation structure 220 includes beveled edge structures 221. Two beveled edge structures 221 are provided. The two beveled edge structures 221 are located at two side edges of the upper radiation panel 210, respectively, and extend along an extending direction of the upper radiation panel 210. The opposite surfaces of each of the two beveled edge structures 221 are inclined surfaces 222. A 3 dB lobe width or a 6 dB lobe width of antenna radiation pattern can be changed by adjusting a height of the beveled edge structures 221 and an inclination angle of the inclined surfaces 222.

As shown in FIG. 3*a* and FIG. 3*b*, the auxiliary radiation structure 220 further includes radiation rings 223, wherein the number of radiation rings 223 is the same as the number of openings 211. A plurality of radiation rings 223 are corresponding to the plurality of openings 211 of the upper radiation panel 210 one by one in position and respectively surround respective openings 211. The plurality of radiation rings 223 are connected one by one, and their joints can be fixed on the upper radiation panel 210 by screws 500. The waveguide structures 120 are also connected one by one, and screw holes are provided at their joints. In this way, the upper radiation panel 210 can be connected to the waveguide radiation block 101 by screws 500. An extension plate 130 is connected at an edge of the lower radiation panel 110, and the upper radiation panel 210 and the extension plate 130 are connected by screws 500.

In Embodiment 3, the plurality of radiation rings 223 are of an integrated structure.

In other embodiments of the present disclosure, the plurality of radiation rings 223 also may be of a split structure, and the plurality of radiation rings 223 are connected one be one through connecting parts.

In other embodiments of the present disclosure, the auxiliary radiation structure 220 may include only the beveled edge structures 221 or only the radiation rings 223.

It should be noted that the antenna shown in FIG. 3*a* and FIG. 3*b* may be used as a wide-band dual-polarized base station antenna.

Figure 4:
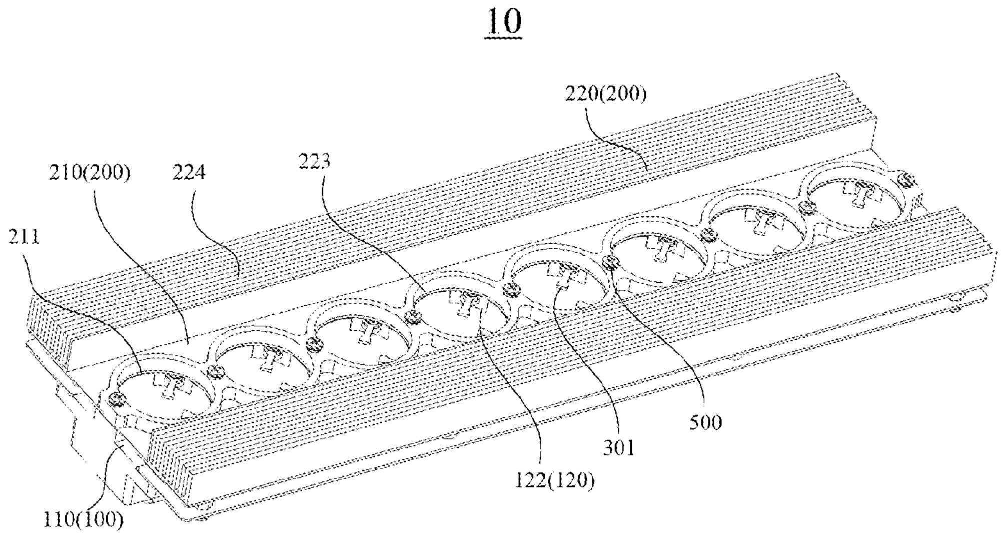
FIG. 4 is a structural schematic diagram of an antenna in Embodiment 4 of the present disclosure.

As shown in FIG. 4, in Embodiment 4 of the present disclosure, different from that in Embodiment 3, the auxiliary radiation structure 220 does not include the beveled edge structure 221, and the auxiliary radiation structure 220 includes choke slots 224 provided at a side of the upper radiation panel 210 facing away from the lower radiation panel 110. A plurality of choke slots 224 are provided in parallel and are symmetrical with respect to the waveguide structures 120, and the choke slots 224 extend along an extending direction of the upper radiation panel 210. The greater the number of choke slots 224 is, the better a front-to-back ratio of a radiation pattern of the antenna 10 is.

In other embodiments of the present disclosure, the auxiliary radiation structure 220 may include a right-angled edge structure. The right-angled edge structure is provided at the side of the upper radiation panel 210 facing away from the lower radiation panel 110, and the right-angled edge structure is located at an edge of the upper radiation panel 210 and extends along the extending direction of the upper radiation panel 210. Alternatively, the auxiliary radiation structure 220 also may include other structures, which is not limited in the present disclosure.

Figure 5:
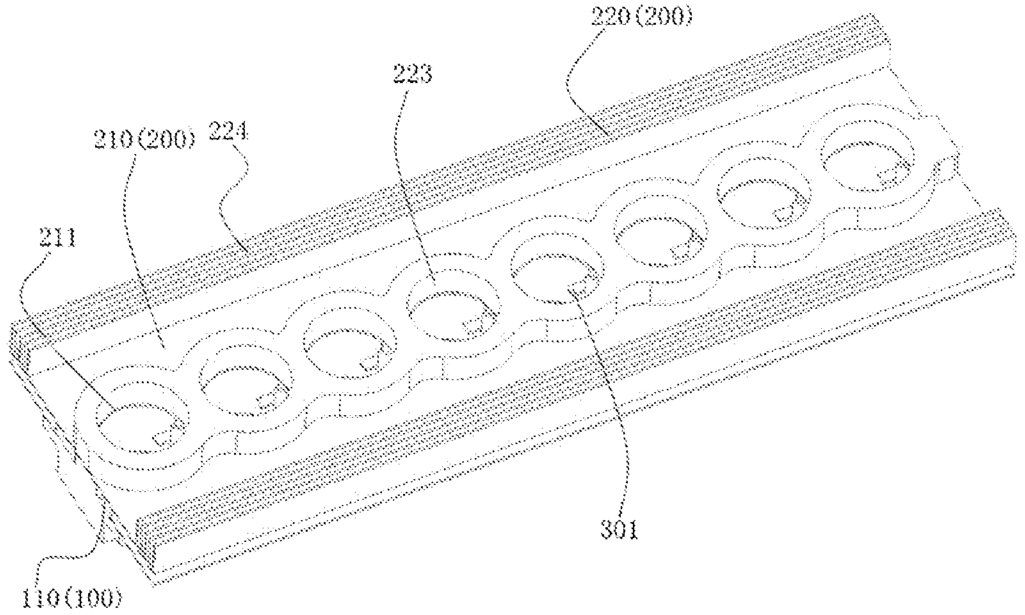
FIG. 5 is a first structural schematic diagram of an antenna in Embodiment 5 of the present disclosure.
Figure 6:
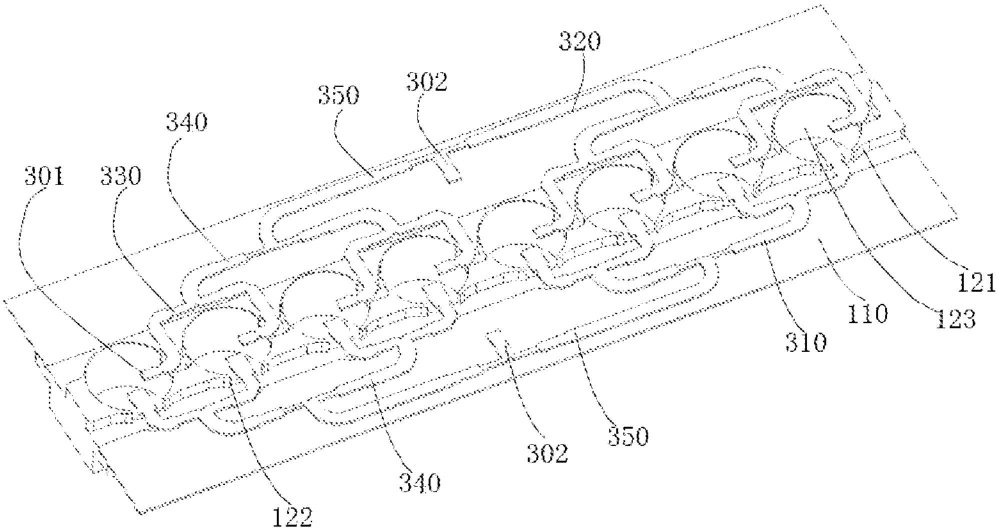
FIG. 6 is a second structural schematic diagram of the antenna in Embodiment 5 of the present disclosure (without showing the upper-layer radiator)

As shown in FIG. 5 and FIG. 6, in Embodiment 5 of the present disclosure, different from that in Embodiment 1, compared to the positive and negative 45 degree polarization method shown in FIG. 1, the polarization method used in Embodiment 5 is horizontal and vertical polarization method.

As shown in FIG. 6, in Embodiment 5, the feeding network 300 includes a first network portion 310 and a second network portion 320. The first network portion 310 and the second network portion 320 are independent from each other, and the first network portion 310 and the second network portion 320 are located at two sides of the waveguide structures 120 respectively. Two notches 122 are provided at the upper end 121 of each waveguide structure 120, wherein one notch 122 is configured for a first end 301 of the first network portion 310 to pass through, and the other notch 122 is configured for a first end 301 of the second network portion 320 to pass through. In the embodiment of the present disclosure, the first network portion 310 and the second network portion 320 are respectively corresponding to two polarizations, and the two polarizations share one waveguide structure 120, thereby facilitating in simplifying the structure of the antenna 10; and polarization adopts a horizontal and vertical polarization method.

In the embodiment of the present disclosure, the first network portion 310 and the second network portion 320 are of the same structure. In other embodiments of the present disclosure, the first network portion 310 and the second network portion 320 may be of completely different structures. This is not limited in the present disclosure.

Figure 7:
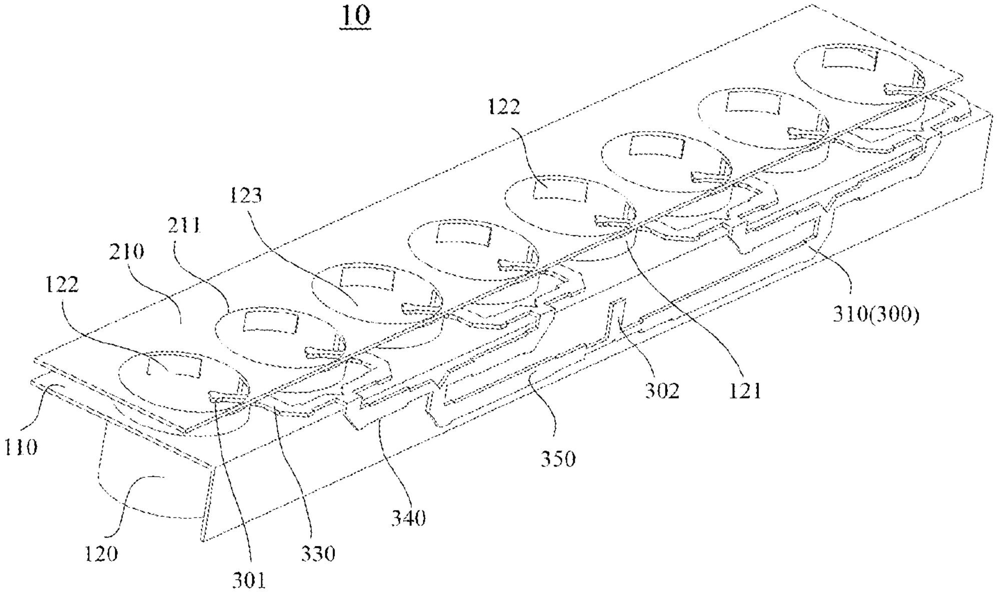
FIG. 7 is a structural schematic diagram of an antenna in Embodiment 6 of the present disclosure.

As shown in FIG. 7, in Embodiment 6 of the present disclosure, different from that in Embodiment 1, the feeding network 300 includes only the first network portion 310, and does not include the second network portion 320. In addition, the first network portion 310 is not located on the same plane, but is located on two planes having an included angle.

Specifically, a side edge of the lower radiation panel 110 provided with the first network portion 310 can be bent towards a direction facing away from the upper radiation panel 210, and a part of the first network portion 310 is also bent therewith towards the direction facing away from the upper radiation panel 210.

In other embodiments of the present disclosure, a bending direction of the feeding network 300 may be different, and an arrangement position of the feeding network 300 also may be different. The structure or the vertical position of the feeding network 300 are not limited in the present disclosure, as long as the feeding network 300 can be connected to the waveguide structures 120.

It should be noted that the antenna 10 in Embodiment 6 of the present disclosure can be used as a single-polarized antenna, and definitely, by providing the second network portion 320 at the other side of the waveguide structures 120, the antenna 10 also can be made into a dual-polarized antenna. A structure of the second network portion 320 can be completely the same as and symmetrical with the structure of the first network portion 310. Correspondingly, a side edge of the lower radiation panel 110 provided with the second network portion 320 can be bent towards a direction facing away from the upper radiation panel 210, and a part of the second network portion 320 also can be bent therewith towards the direction facing away from the upper radiation panel 210, which is not limited in the present disclosure.

Figure 8:
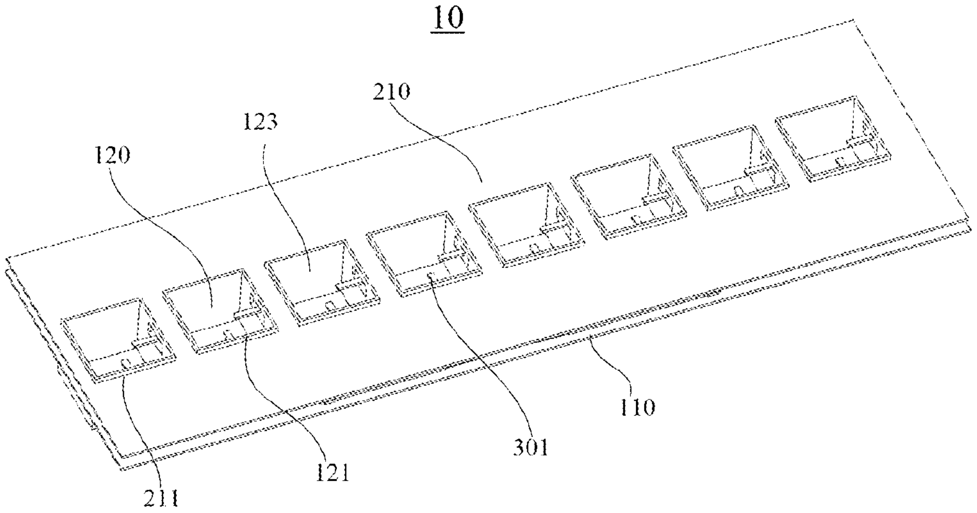
FIG. 8 is a first structural schematic diagram of an antenna in Embodiment 7 of the present disclosure.
Figure 9:
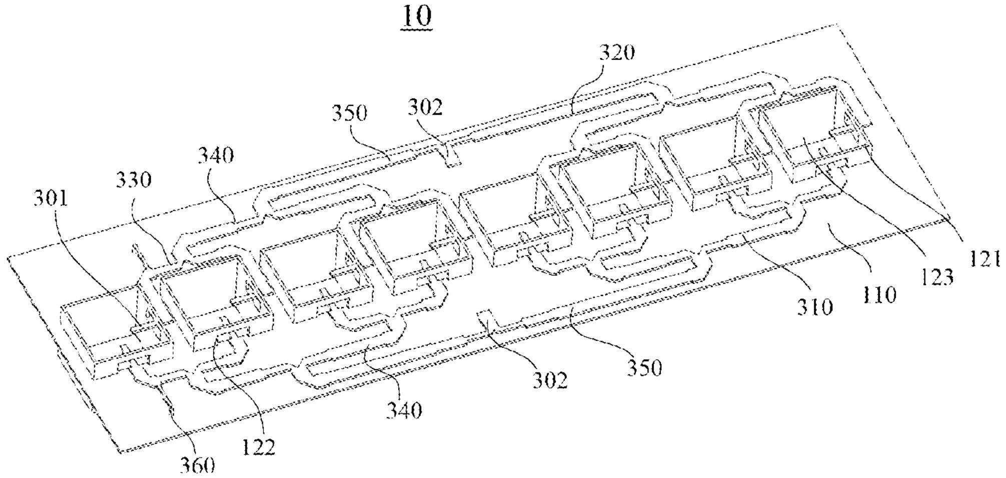
FIG. 9 is a second structural schematic diagram of the antenna in Embodiment 7 of the present disclosure (without showing the upper-layer radiator).

As shown in FIG. 8 and FIG. 9, in the Embodiment 7 of the present disclosure, the different from Embodiment 1 is that the waveguide structures 120 are not circular waveguides but rectangular waveguides, and the rectangular waveguides are regular metal waveguides with a rectangular section and filled therein with an air medium. The rectangular waveguides have general properties similar to those of circular waveguides.

In Embodiment 7, the openings 211 of the upper radiation panel 210 are also rectangular, and the upper ends 121 of the waveguide structures 120 pass upwards through the openings 211 of the upper radiation panel 210.

In other embodiments of the present disclosure, the upper ends 121 of the waveguide structures 120 can be connected through a connecting plate, thereby improving installation stability of the waveguide structures 120.

In other embodiments of the present disclosure, the waveguide structures 120 can be other special-shaped structures. For example, the waveguide structures 120 may be ridge waveguides. The ridge waveguide can be regarded as being formed by bending a wide wall of a rectangular waveguide, and bandwidth thereof is wider than that of the rectangular waveguide.

In addition, as shown in FIG. 9, the feeding network 300 is not of a strip-shaped line structure but of a microstrip structure. The microstrip structure is a microstrip line, which is a microwave transmission line constituted by a single conductor belt supported on a dielectric substrate, and has advantages such as a small volume, a light weight, a wide use frequency band, a high reliability, and a low manufacturing cost.

In other embodiments of the present disclosure, the feeding network 300 may be of a coaxial line structure, wherein the coaxial line is a broadband microwave transmission line with air or high-frequency medium being filled between inner and outer conductors of a guided system constituted by two coaxial cylindrical conductors. Alternatively, the feeding network 300 may be of a coplanar waveguide structure. Specifically, a central conductor belt is fabricated on one side of a dielectric substrate, and conductor planes are fabricated on two sides adjoining the central conductor belt. In this way, a coplanar waveguide is formed, also called as a coplanar microstrip transmission line. This is not limited in the present disclosure.

It is also worth noting that in the present disclosure, the polarization of the antenna can be achieved through horizontal polarization, vertical polarization, positive and negative 45 degree polarization, X polarization, Y polarization, Z polarization, oblique polarization, etc. The polarization used does not affect the structure of the antenna.

It is also worth noting that in the present disclosure, compared to the ordinary placement method, FIGS. 1 and 2 are schematic diagrams of positive and negative 45 degree polarization, while FIGS. 5 and 6 are schematic diagrams of horizontal and vertical polarization. The structures shown in FIGS. 1 and 5 are in the form of circular waveguides, while the structures shown in FIGS. 8 and 9 are in the form of rectangular waveguides.

It should be indicated that in the present text, relational terms such as first and second are merely used to distinguish one entity or operation from another entity or operation, while it is not necessarily required or implied that these entities or operations have any such practical relation or order. Moreover, terms such as "include", "contain" or any other variants thereof are intended to be non-exclusive, so that a process, a method, an article, or a device including a series of elements includes not only those elements, but also includes other elements that are not explicitly listed, or further includes elements inherent to such process, method, article, or device. Without more restrictions, an element defined with wordings "including a . . . " does not exclude the presence of other same elements in the process, method, article or device including said element.

Various embodiments in the present description are described in a related manner, the same and similar parts between the various embodiments may be referred to each other, and each embodiment focuses on differences from other embodiments. Particularly, for a system embodiment, since it is substantially similar to a method embodiment, it is described relatively simply, and reference can be made to the description in parts of the method embodiment for related parts.

The above-mentioned are merely preferable embodiments of the present disclosure, and are not used to limit the present disclosure. Any amendments, equivalent replacements, improvements and so on, made within the spirit and principle of the present disclosure, should be covered within the scope of protection of the present disclosure.

What is claimed is:

1. An antenna, comprising:

a waveguide radiator, comprising a lower radiation panel and at least one waveguide structure provided on the lower radiation panel;

an upper-layer radiator, comprising an upper radiation panel, wherein the upper radiation panel is provided with at least one opening, and the at least one opening is corresponding to the at least one waveguide structure one by one; and a feeding network, connected to each waveguide structure of the at least one waveguide structure, wherein at least a part of the feeding network is provided between the lower radiation panel and the upper radiation panel, and has a gap with the lower radiation panel and the upper radiation panel, respectively.

2. The antenna according to claim 1, wherein each waveguide structure of the at least one waveguide structure penetrates through the lower radiation panel; an upper end of each waveguide structure of the at least one waveguide structure extends out of the lower radiation panel towards a direction of the upper radiation panel; and the feeding network is connected to the upper end of each waveguide structure of the at least one waveguide structure.

3. The antenna according to claim 2, wherein each of the at least one waveguide structure has a hollow cavity, and the upper end of each waveguide structure of the at least one waveguide structure is provided with at least one notch; and the feeding network at least comprises a first-level connecting line, wherein the first-level connecting line comprises at least one first end, and the at least one first end extends into the hollow cavity of a corresponding waveguide structure of the at least one waveguide structure through a corresponding notch of the at least one notch.

4. The antenna according to claim 3, wherein each of the at least one waveguide structure is a cylindrical structure provided on the lower radiation panel, and an inner cavity of the cylindrical structure forms the hollow cavity of one waveguide structure of the at least one waveguide structure; or the waveguide radiator comprises a waveguide radiation block, wherein an upper surface of the waveguide radiation block constitutes the lower radiation panel, the waveguide radiation block has at least one through hole in a thickness direction, and each of the at least one through hole constitutes the hollow cavity of one waveguide structure of the at least one waveguide structure.

5. The antenna according to claim 3, wherein the feeding network comprises a first network portion and a second network portion, wherein the first network portion and the second network portion are located at two sides of the at least one waveguide structure, respectively; and two notches are provided at the upper end of each waveguide structure of the at least one waveguide structure, wherein one notch of the two notches is configured for a first end of the first network portion to pass through, and the other notch of the two notches is configured for a first end of the second network portion to pass through.

6. The antenna according to claim 3, wherein the feeding network further comprises at least one ground terminal connected to the first-level connecting line.

7. The antenna according to claim 1, wherein each of the at least one waveguide structure is a rectangular waveguide, a circular waveguide or a ridge waveguide.

8. The antenna according to claim 1, wherein the upper-layer radiator further comprises an auxiliary radiation structure, wherein the auxiliary radiation structure is provided at a side of the upper radiation panel facing away from the lower radiation panel, and is attached to the upper radiation panel.

9. The antenna according to claim 8, wherein the auxiliary radiation structure comprises at least one beveled edge structure and/or at least one radiation ring, wherein the at least one beveled edge structure extends along an extending direction of the upper radiation panel, and each of the at least one radiation ring is corresponding to one opening of the at least one opening of the upper radiation panel in position and surrounds the one opening.

10. The antenna according to claim 9, wherein the number of the at least one opening of the upper radiation panel is the same as the number of the at least one waveguide structure, and the number of the at least one radiation ring is the same as the number of the at least one opening; and a plurality of radiation rings are corresponding to a plurality of openings in position one by one, and the plurality of radiation rings are connected one by one.

11. The antenna according to claim 8, wherein the auxiliary radiation structure comprises at least one choke slot or at least one right-angled edge structure provided at the side of the upper radiation panel facing away from the lower radiation panel, and the at least one choke slot or the at least one right-angled edge structure extends along an extending direction of the upper radiation panel.

12. The antenna according to claim 1, wherein the waveguide radiator and the upper-layer radiator are made of a metal material, or plated with a metal material on surfaces.

13. The antenna according to claim 1, wherein the feeding network is made of a metal material, and the metal material has a thickness of 0.1-2 mm, preferably, 0.1 mm, 0.5 mm, 0.8 mm, 1 mm, 1.2 mm or 1.5 mm.

14. The antenna according to claim 1, wherein the feeding network is of a strip-shaped line, microstrip, coaxial line or coplanar waveguide structure.

15. The antenna according to claim 1, wherein the feeding network is located on the same plane; or the feeding network is at least partially bent, and the feeding network is located on two planes having an included angle.

16. The antenna according to claim 1, wherein the feeding network is of a series-connection structure, a parallel-connection structure or a hybrid structure including series connection and parallel connection.

17. The antenna according to claim 1, further comprising a plurality of insulating gaskets, wherein the plurality of insulating gaskets are provided respectively between the feeding network and the lower radiation panel and between the feeding network and the upper radiation panel.

18. The antenna according to claim 1, wherein a polarization of the antenna is any one of horizontal polarization, vertical polarization, positive and negative 45 degree polarization, X polarization, Y polarization, Z polarization, and oblique polarization.

* * * * *